(12) United States Patent
Ekman

(10) Patent No.: US 7,711,936 B2
(45) Date of Patent: May 4, 2010

(54) BRANCH PREDICTOR FOR BRANCHES WITH ASYMMETRIC PENALTIES

(75) Inventor: Magnus Ekman, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 400 days.

(21) Appl. No.: 11/846,461

(22) Filed: Aug. 28, 2007

(65) Prior Publication Data

US 2009/0063831 A1 Mar. 5, 2009

(51) Int. Cl.
*G06F 9/32* (2006.01)
(52) U.S. Cl. ........................................ 712/239; 712/236
(58) Field of Classification Search ........................ None
See application file for complete search history.

(56) References Cited

U.S. PATENT DOCUMENTS

| 5,611,063 | A | * | 3/1997 | Loper et al. | 712/205 |
| 5,751,945 | A | * | 5/1998 | Levine et al. | 714/47 |
| 6,079,006 | A | * | 6/2000 | Pickett | 711/213 |
| 6,286,135 | B1 | * | 9/2001 | Santhanam | 717/146 |
| 6,308,261 | B1 | * | 10/2001 | Morris et al. | 712/219 |
| 6,332,214 | B1 | * | 12/2001 | Wu | 717/141 |
| 6,718,839 | B2 | * | 4/2004 | Chaudhry et al. | 74/137 |
| 7,143,403 | B2 | * | 11/2006 | Hank | 717/159 |
| 2004/0024982 | A1 | * | 2/2004 | Le et al. | 711/167 |
| 2005/0262308 | A1 | * | 11/2005 | Nishiyama | 711/137 |
| 2006/0101249 | A1 | * | 5/2006 | Bacon et al. | 712/226 |

* cited by examiner

*Primary Examiner*—Eric Coleman
(74) *Attorney, Agent, or Firm*—Osha • Liang LLP

(57) ABSTRACT

An approach for improving efficiency of speculative execution of instructions is disclosed. In one embodiment, a branch predictor entry associated with a particular branch instruction is accessed when the particular branch instruction is to be speculatively executed. The branch predictor entry may take on different values indicating whether a first possible path or a second possible path should be executed. Based upon a current value of the branch predictor entry, a predicted path for the particular branch instruction may be determined. Instructions along the predicted path may be executed, before the particular branch instruction is resolved. Once the particular branch instruction is resolved, a cost associated with executing the one or more instructions may be determined. Accordingly, the branch predictor entry may be updated by an amount that is commensurate with the cost.

20 Claims, 7 Drawing Sheets

```
0x0200  subcc reg0, 0x5
0x0204  beq 0x4004          (prediction resolution: not taken)
0x0208  subcc reg8, 0x08
0x020c  beq 0x051c          (prediction resolution: taken)
   .  .  .
0x051c  ld 0x6004, reg1     (cache miss)
0x0520  subcc reg1, 0x13
0x0524  beq 0x40c0          (prediction resolution: taken)
0x0528  add reg2, reg3, reg4  (independent speculative instruction)
0x0530  sub reg4, reg7, reg5  (independent speculative instruction)
   .  .  .
```

Fig. 4

BRANCH PREDICTOR FOR BRANCHES WITH ASYMMETRIC PENALTIES

BACKGROUND

Before an instruction can be actually executed by a processor, a data item may sometimes have to be loaded first from cache or memory—this is known as a load miss. This load miss occurs, for example, when the data item required by the instruction is not yet loaded in internal memory locations in the processor. When such a load miss occurs, some techniques provide that the processor, instead of idly waiting, may speculatively execute other instructions while the load miss is being concurrently resolved by the processor. Clearly, efficiency gain from using these speculative execution techniques is highly dependent on whether instructions to be speculatively executed are correctly predicted at runtime.

If a software module comprises only sequential logic, it is relatively easy to predict what instructions are to follow from a particular instruction. On the other hand, where a software module involves constructs that give rise to branch instructions, since any such branch instruction may comprise two or more possible paths, which of the two or more paths of the branch instruction may actually be executed is not known until after the branch instruction is actually executed (or resolved).

To handle this dilemma, a processor may use a facility known as a branch predictor entry to make a prediction as to which path following a branch instruction should be taken. Specifically, the processor may associate a branch predictor entry with a branch instruction based on a hint provided by a compiler. Such a branch predictor entry may be implemented as a counter (e.g., a saturation counter) that can take on a plurality of values. At runtime, a current value of the counter indicates to the processor to take (for example, by jumping to a non-sequential instruction), or alternatively not to take a particular path (for example, by continuing to execute a sequential instruction that follows the branch instruction). Since software modules that give rise to processor instructions sometimes exhibit predictable behaviors, past execution history of the same branch instruction may be taken into account in setting the value of the counter (or branch predictor entry).

For example, when a load miss is resolved and thus the branch instruction is actually executed, a branch prediction logic may determine whether the prior prediction was correct (i.e., a prediction hit) or not (i.e., a prediction miss). The branch predictor entry associated with the branch instruction may be updated accordingly to favor a path that has actually been taken more frequently in the past. In this manner, future branch predictions may be influenced by past execution history of the branch instruction.

However, generally speaking, the total number of branch predictor entries is limited and not all possible address values of instructions can be mapped to their own separate branch predictor entries. In fact, at runtime the branch prediction logic may often map two or more different branch instructions to the same counter (branch predictor entry).

When two or more different branch instructions share the same counter, a prediction for a correct path of one branch instruction may indicate a prediction for a wrong path of the other branch instruction that shares the counter. As a result, updates of the counter from different branch instructions interfere with each other. This interference may cause extra prediction misses, in addition to those that would be generated by predictable or unpredictable behaviors of the software modules involved. Moreover, the cost of these extra prediction misses can be very high as they may be amplified by some repetitive behaviors of the software modules involved. In particular, wasted speculative executions from one of these extra prediction misses may amount to several hundreds of CPU cycles or more.

For these reasons, the existing techniques for sharing branch predictor entries are not as efficient as would be desired and an improved branch prediction mechanism that reduces adverse impact of interference between branches that share branch predictor entries is needed.

SUMMARY

In accordance with one embodiment of the present invention, there is provided a branch prediction mechanism that reduces adverse impact of interference between branches that share branch predictor entries. For the purpose of the present invention, the branch prediction mechanism may be implemented in hardware, software, or a combination of the two. For example, the branch prediction mechanism may be implemented either as a part of a processor in one embodiment or as separate logic that works in conjunction with the processor in another embodiment. In some embodiments, the branch predictor entries may be implemented as counters. In various embodiments, any such counter may comprise 1 bit, 2 bits, 3 bits, etc.

In one embodiment, a branch predictor entry can take on a plurality of different values. Any value in a first set of values in the plurality of different values indicates a first possible path. Likewise, any value in a second set of values in the plurality of different values indicates a second possible path. Thus, when encountering a particular branch (or branch instruction), the processor may access the branch predictor entry associated with the particular branch and, based upon a current value of the branch predictor entry, determine or select a predicted path for the particular branch.

Thereafter, the processor speculatively executes one or more instructions along the predicted path, before the particular branch is resolved. Here, the term "speculatively executed" means that the predicted path may turn out to be a correct path, or a wrong path, depending on how the branch is resolved. As used herein, the term "resolved" refers to actual execution of the particular branch instruction after all data dependencies (including any load misses) have been resolved.

Once the branch is resolved, in one embodiment, the branch prediction mechanism can determine a cost associated with the predicted path. For example, the cost may be determined based on the number of processor cycles before the particular branch is resolved. In an alternative embodiment, the branch prediction mechanism can determine a cost associated with the predicted path based on what type of data source is needed to resolve a load miss. For example, if a required data item is to be loaded from a level 2 cache (due to a level 1 cache miss), the predicted branch may be classified as low cost, as it may take ten cycles to fetch such a data item. On the other hand, if the data item is to be loaded not from cache but rather main memory (due to, for example, a level 2 cache miss), the predicted branch may be classified as high cost, as it may take hundreds of cycles to fetch such a data item. Thus, based on what memory structure the data item is to be fetched from, the branch prediction mechanism may classify a predicted branch as low, medium or high cost.

In any event, the cost of the predicted branch may be estimated or determined in various embodiments. Based on that, the branch prediction mechanism determines whether the branch predictor entry should be updated. In one embodiment, a (separate) dynamically allocated counter (DAC) may be associated with the branch predictor entry (e.g., also a counter). The value stored in this DAC may be updated by a large step for a prediction event (such as a hit or a miss) for a high cost branch, and may be updated by a small step for a prediction event for a low cost branch.

In some embodiments, if the DAC indicates a transition from a span of values indicating one path to another span of values indicating the other path, the branch predictor entry will be updated accordingly. Thus, under this approach, a hit or miss from the high cost branch may cause the branch predictor entry to be updated immediately, since such updating from the high cost branch is made with a large step. On the other hand, a hit or miss from the low cost branch may not cause the branch predictor entry to be updated immediately, since such updating from the low cost branch is made with a small step. In other words, the high cost branch is given more weight. In this manner, even if the branch predictor entry is shared by both branches, the indicator will largely indicate a desired path for the high cost branch. This approach avoids, or at least reduces, the number of potential additional misses due to interference from the low cost branch to the high cost branch that shares the same branch predictor entry with the low cost branch. While some additional misses may be caused with respect to the low cost branch, this approach overall improves the processor's efficiency.

In some embodiments, instead of using a separate, dynamically allocated counter to keep track of hits or misses for the low cost branch, the branch prediction mechanism may update the branch predictor entry in different manners for the branches. In one embodiment, when a high cost branch experiences a prediction hit or miss, the branch predictor entry may be incremented or decremented using a larger step, say two; however, when a low cost branch experiences a prediction hit or miss, the branch predictor entry may be incremented or decremented using a smaller step, say one.

Thus, under this approach, because the value of the branch predictor entry is affected more by the high cost branch than by the low cost branch, even if the branch predictor entry is shared by both branches, the indicator will more likely indicate a desired path for the high cost branch. Accordingly, this approach avoids, or at least reduces, the number of potential additional misses due to interference from the low cost branch to the high cost branch that shares the same branch predictor entry with the low cost branch. Therefore, like the approach that uses a separate (dynamically allocated) counter, as previously discussed, this approach also improves the overall processor's efficiency.

These and other aspects of the present invention will be discussed in greater detail in the following sections.

BRIEF DESCRIPTION OF THE DRAWINGS

FIG. 4 shows an example code of instruction flows involving branches, in accordance with one embodiment of the present invention.

DETAILED DESCRIPTION OF EMBODIMENT(S)

Processor Overview

Figure 1A:
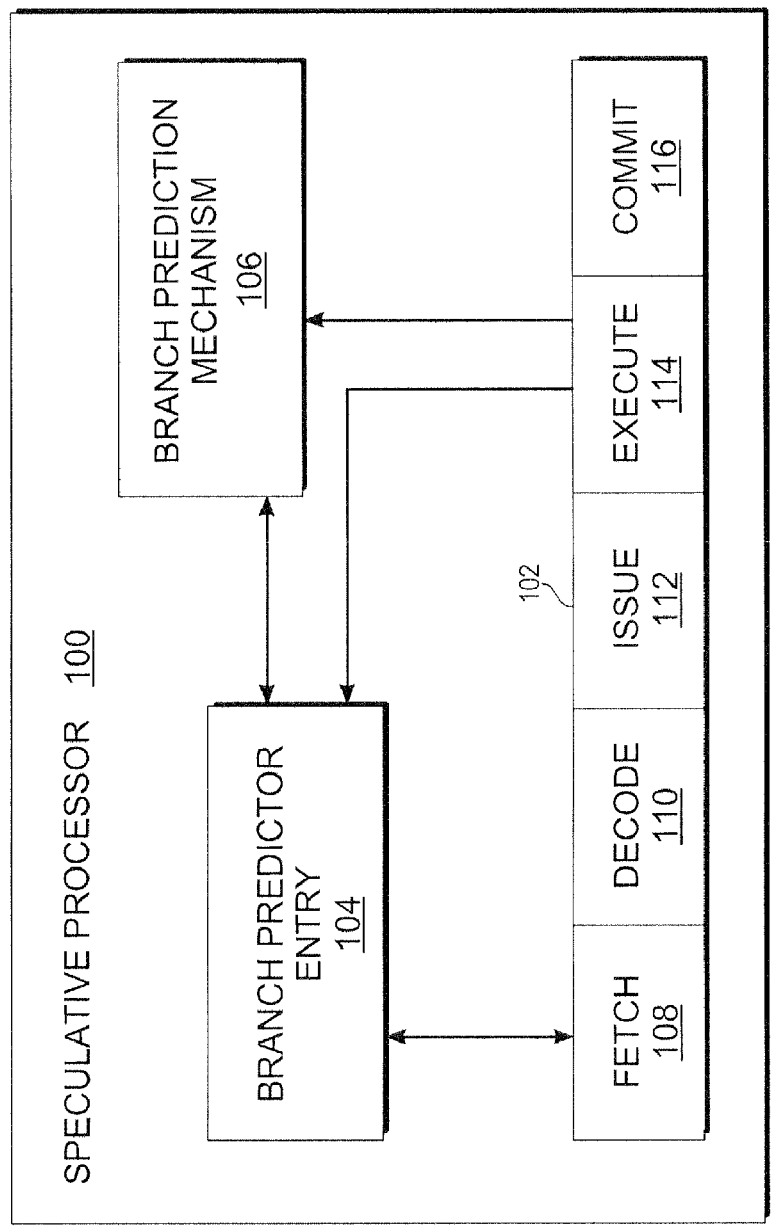
FIG. 1A is a functional block diagram of a speculative processor in which one embodiment of the present invention may be implemented.

With reference to FIG. 1A, there is shown a functional block diagram of a speculative processor 100 in which one embodiment of the present invention may be implemented. As shown, the speculative processor 100 comprises an instruction processing pipeline 102, a branch predictor entry 104, and a branch prediction mechanism 106.

Instruction processing pipeline 102 in one embodiment comprises a number of stages, namely, Fetch 108, Decode 110, Issue 112, Execute 114, and Commit 116. Particularly, Fetch 108 fetches an instruction from memory structures located within or without the processor 102 and passes the instruction (in the form of code and in some cases data constituents, for example) to another stage further along the pipeline 102, in this case, Decode 110. When the instruction reaches Execute 114, Execute 114 executes the instruction and places the results of the execution in various internal data stores in the processor 100. Finally, Commit 116 commits the results of the execution. When encountering a branch instruction, Fetch 108 may access branch predictor entry 104 to determine a prediction for a path of the branch instruction for speculative execution. Based on the prediction, Fetch 108 may fetch instructions along the predicted path and propagate those instructions to Execute 114 (through other stages) for speculative execution. The results of the speculative execution generated by Execute 114 may be kept in an intermediate storage. Such results may be flushed or thrown away, if the instructions are part of one or more instructions along a path that is a result of a prediction miss.

Thus, the term "executes an instruction" may refer to actually executing an instruction or, alternatively, speculatively executing an instruction. In the case of actually executing an instruction, the results generated by Execute 114 in executing the instruction will be immediately committed by pipeline 102 (or more specifically by the stage Commit 116 in the pipeline 102). On the other hand, in the case of speculatively executing an instruction, the results generated by Execute 114 in executing such an instruction will not be committed by pipeline 102 until after it is resolved that the predicted path that comprises the speculatively executed instruction is a correctly predicted path (i.e., a prediction hit). Such a resolution on whether the predicted path is correct may not come until many instructions have been speculatively executed.

In the case of speculative execution, since a branch prediction may not be resolved until after a considerable number of cycles (for example, hundreds of cycles), a number of instructions may be speculatively executed and the results from those executions may be accumulated without committing. Only after it is resolved that the predicted path is correct, may the results of the speculative executions be committed. However, if it turns out that the predicted path is incorrect, the accumulative results will be flushed without being committed. A previously unpredicted branch of instructions will then have to be actually executed.

In any event, when the branch instruction related to the prediction as previously discussed is actually executed by Execute 114, the previous prediction is resolved. The prediction resolution information may be propagated to branch prediction mechanism 106 by Execute 114. The prediction resolution information propagated may be used by branch prediction mechanism 106 to determine whether the associated branch predictor entry 104 should be updated.

Figure 1B:
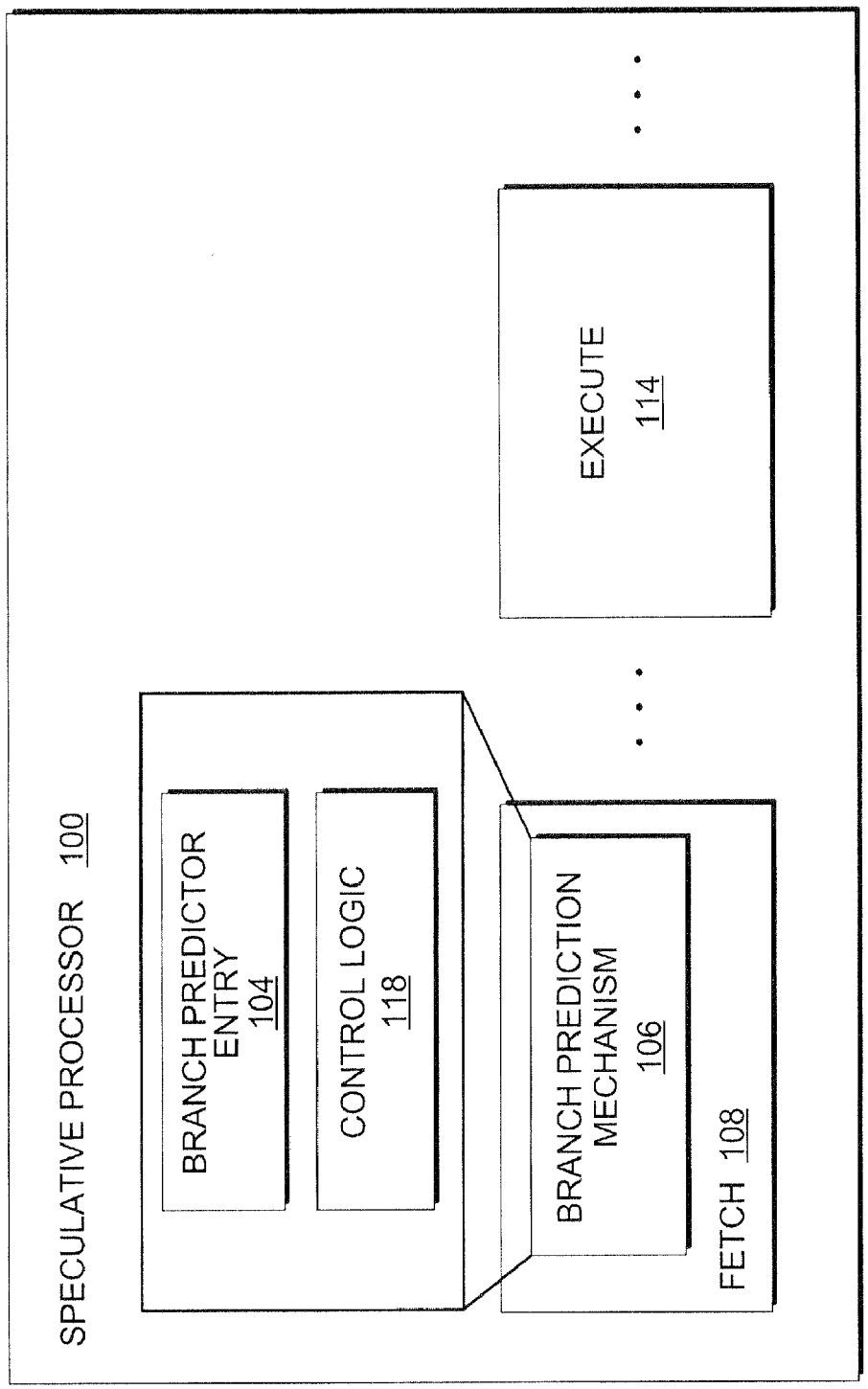
FIG. 1B is an alternative functional block diagram of a speculative processor in which one embodiment of the present invention may be implemented.

Branch prediction mechanism 106 has been so far described as separate from the processor pipeline. It should be noted that this is for illustration purposes only. For the purpose of this description, branch prediction mechanism 106 may be integrated in a stage of the processor pipeline. For example, as illustrated in FIG. 1B, branch prediction mechanism 106 may be implemented as part of Fetch 108. Such branch prediction mechanism 106 may interact within Fetch 108 to determine a path for speculative execution as previously described. In addition, branch prediction mechanism 106 may comprise its own sub-components such as control logic 118 and one or more branch predictor entries 104. As will be further explained, the one or more branch predictor entries 104 may be arranged in an array and associated with other structures such as dynamically assigned counters. Such a branch prediction mechanism 106 may receive prediction resolution information from Execute 114 (when an associated branch instruction is actually executed). Dots as illustrated in FIG. 1B indicate zero or more pipeline stages (such as Decode, Issue, etc.) that may be implemented in the speculative processor 100 in addition to Fetch 108 or Execute 114.

Branch, Path, and Predicate

As noted before, a software module may contain non-sequential logical flows. For example, the software module may contain branches such as those corresponding to high level constructs "if . . . else . . . ", or "switch . . . case . . . . " The software module may also contain loops such as those corresponding to high level constructs "for" loop or "while" loops. For the purpose of the present invention, high level constructs such as those involving loops or three or more branches may be decomposed into simple branches each of which comprises two different paths.

For the purpose of illustration, apart from comprising two different paths, a branch corresponds to a predicate that is implemented by a branch instruction. The result of the branch instruction indicates whether the predicate is evaluated to true or false. When the predicate is evaluated to true, one of the two paths will be taken. On the other hand, when the predicate is evaluated to false, the other path will be taken.

Branch Predictor Array

Figure 2:
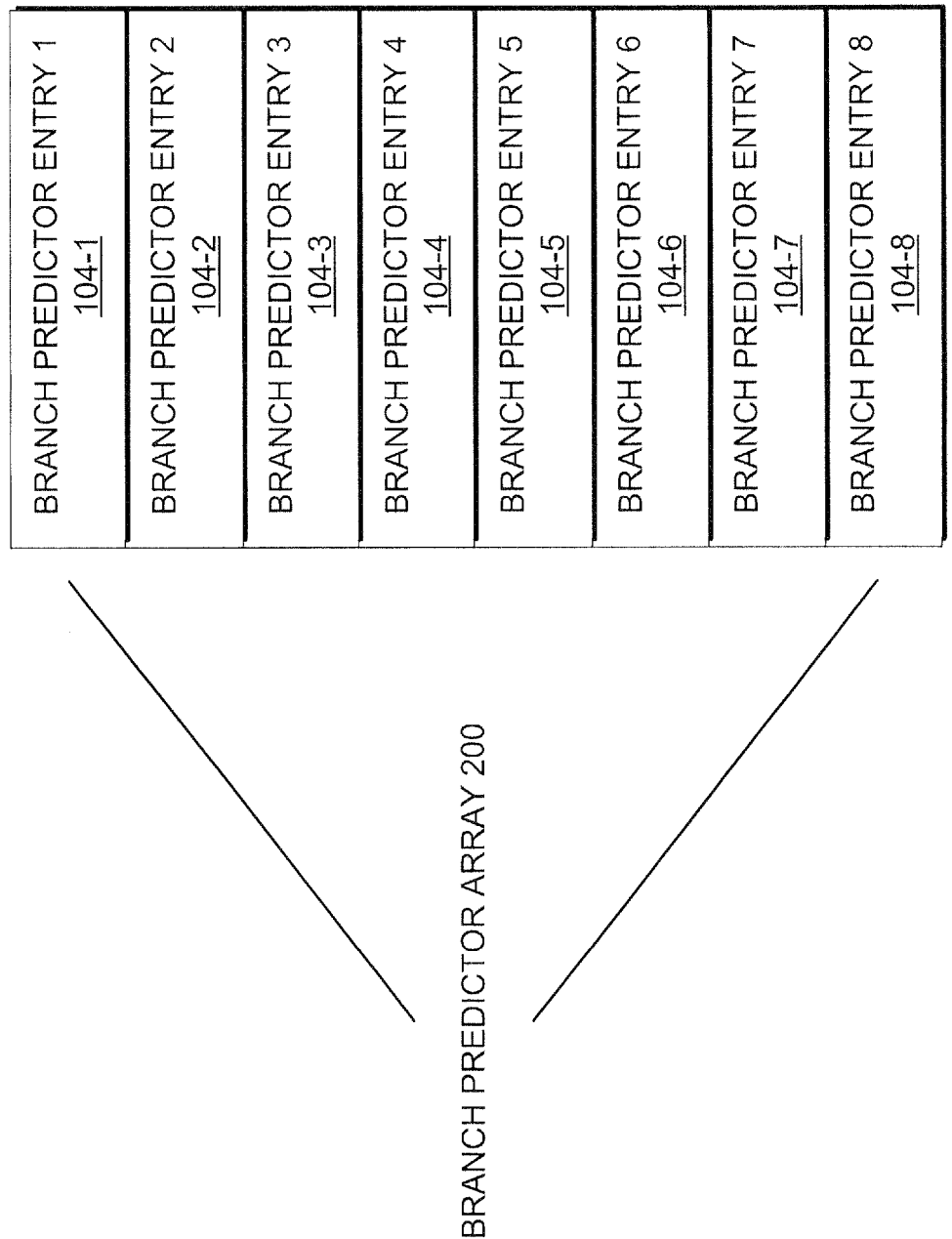
FIG. 2 shows an example of a branch predictor array, in accordance with one embodiment of the present invention.

A speculative processor such as 100 may have an array of branch predictor entries at its disposal, such as array 200 shown in FIG. 2. Such an array 200 may comprise multiple branch predictor entries that are, for the purpose of illustration, shown as 104-1 through 8 of FIG. 2. In one embodiment, branch predictor entry 104 of FIG. 1A may be a branch predictor entry in this array (200). In one embodiment, when the processor 100 encounters a load miss at a branch instruction, branch prediction mechanism 106 uses the least significant bits of the branch instruction to map to a branch predictor entry in the array 200, say branch predictor entry 3 (104-3 of FIG. 2). In one embodiment, the more branch predictor entries 104 are present (hence the larger the size of the array 200), the more least significant bits are used for such mappings, and the less likely any branch predictor entry 104 in the array 200 will be shared by two or more branch instructions. On the other hand, the fewer branch predictor entries 104 are present (hence the smaller the size of the array 200), the fewer least significant bits are used for such mappings, but the more likely a branch predictor entry 104 in the array 200 will be shared by two or more branch instructions.

Two-Bit Saturation Counter

A typical branch predictor entry today uses a two-bit saturation counter in each entry. In some embodiments, branch predictor entries 104 as illustrated in FIG. 2 are such saturation counters.

As its name indicates, a two-bit saturation counter comprises two bits. Thus, it may have a value of 0x0, 0x1, 0x2 or 0x3. In one embodiment, values of 0x0, 0x1, 0x2, and 0x3 in the saturation counter correspond to mnemonics of "strongly not taken", "weakly not taken", "weakly taken", and "strongly taken", respectively. Such a mnemonic or numeric value in the saturation counter may be used to indicate for a particular branch which path of the particular branch should be taken. For example, when encountering a branch instruction, Fetch 108 can access a saturation counter that is associated with the branch instruction. If it is determined that a value of the saturation counter is "strongly not taken" or "weakly not taken", then a path of the branch instruction that corresponds to consecutive instructions immediately following the branch instruction will be used for speculative execution. In such a case, Fetch 108 will fetch at an instruction address that immediately follows that of the branch instruction. On the other hand, if it is determined that a value of the saturation counter is "strongly taken" or "weakly taken", then the other path of the branch instruction that corresponds to non-consecutive instructions from the branch instruction will be used for speculative execution. In such a case, Fetch 108 will fetch at an instruction address that represents an instruction address jump from that of the branch instruction.

The value of a saturation counter may be updated after an associated branch instruction is resolved. Generally speaking, each time a resolution of the branch instruction indicates that a branched path is actually taken, the counter's value is increased (until a maximum is reached). Similarly, each time a resolution of the branch instruction indicates that the branched path is not actually taken, the counter's value is decreased (until a minimum is reached). In some embodiments, the term "a branched path is taken" means that the processor is to process next instruction at an address (i.e., a first path of an associated branch instruction) that is different from an instruction address (i.e., a second path of the same associated branch instruction) that immediately follows the current instruction address.). In some other embodiments where "delayed branching" techniques are implemented, the term "a branched path is taken" means that the processor will start to process the nth instruction after the branch at an address (i.e., a first path of an associated branch instruction) that is different from an address (i.e., a second path of the same associated branch instruction) that is immediately follows the (n−1)th address, where n is a positive integer.

For example, if the counter's value currently indicates "strongly not taken", but if the branch instruction, when resolved, actually takes the branched path, then the counter's value is updated to push it towards the "taken" direction. In this case, since the counter's value is "strongly not taken", the counter's value may be updated to "weakly not taken". Since software logic often contains repetitions, the branch instruction may be encountered again. Since the counter's value currently indicates "weakly not taken", but if the branch instruction, when resolved, again actually takes the branched path, then the counter's value is updated to push it further towards the "taken" direction. Accordingly, the counter's value may be updated to "weakly taken". Therefore, if a branch instruction is resolved as actually taken enough times, the saturation counter's value will change to predict a taken value, i.e., either "weakly taken" or "strongly taken".

A branch predictor entry may be shared by multiple branch instructions. For example, where the least significant bits of an address of a branch instruction is used to map to an associated branch predictor entry (i.e., counter), several branch instructions that have the same least significant bits in their addresses are mapped to the same associated branch predictor entry.

Among branch instructions that share the same branch predictor entry, one branch instruction may correspond to a low cost branch while another of the branch instructions may correspond to a high cost branch. For example, a low cost branch may comprise several tens of CPU cycles of speculatively executed instructions while a high cost branch may comprise one hundred or more CPU cycles of speculatively executed instructions.

In some embodiments, a branch predictor entry may be updated in a way that is dependent on a cost of a branch that is associated with a branch instruction. For example, if the branch predictor entry currently is "strongly not taken", when a low cost branch resolves to taken, the branch predictor entry may be incremented by one (1). But when a high cost branch that shares the branch predictor entry with the low cost branch resolves to taken, the branch predictor entry may be incremented by two (2). Thus, the high cost branch is given more weight than the low cost branch. Under this embodiment of the present invention, if the branch predictor entry is a two-bit saturation counter, for a low cost branch, two prediction misses are needed to alter the counter from "not taken" to "taken", if the counter's value prior to updates is "strongly not taken". On the other hand, for a high cost branch, regardless of whether the counter's value prior to an update is "strongly not taken" or "weakly not taken", only one prediction miss is needed to alter the counter from "not taken" to "taken". Therefore, under this approach, even if the branch predictor entry is shared between two branches, as long as one of the two branches is a low cost one while the other is a high cost one, the interference from the low cost branch to the high cost branch is reduced.

Thus, in situations where a high cost branch and a low cost branch are executed in an interleaving manner (e.g., one executed after the other), once the high cost branch has been executed twice, the counter will produce a value of at least "weakly taken" every time the high cost branch is to be executed, no matter what the case is for the low cost branch (i.e., no matter whether this "taken" prediction is a hit or a miss for the low cost branch). In one embodiment, even if a prediction for the low cost branch is a miss, since the prediction for the high cost branch is correct, hundreds of cycles of work associated with the high cost branch are saved, producing an overall efficiency gain for the processor.

Three-Bit Counter

In an embodiment, a branch predictor entry may use a counter that is longer than two bits, for example, three or more bits. In some alternative embodiments, branch predictor entries 104 of FIG. 2 may be counters that are three or more bits long.

Since a three-bit counter comprises three bits, it may have a value of 0x0, 0x1, 0x2, 0x3 . . . , 0x7. In one embodiment, these values may be grouped into different spans. For example, possible values of a three-bit counter may be grouped into four spans, such as span 0 (0x0, 0x1), span 1 (0x2, 0x3), span 2 (0x4, 0x5), span 3 (0x6, 0x7). These spans correspond to mnemonics of "strongly not taken", "weakly not taken", "weakly taken", and "strongly taken", respectively. When a branch instruction generates a load miss, Fetch 108 can access a saturation counter that is associated with the branch instruction. If it is determined that a value of the three-bit counter is "strongly not taken" or "weakly not taken", then a path of the branch instruction that corresponds to consecutive instructions immediately following the branch instruction will be used for speculative execution. In such a case, Fetch 108 will fetch at an instruction address that immediately follows that of the branch instruction. On the other hand, if it is determined that a value of the three-bit counter is "strongly taken" or "weakly taken", then the other path of the branch instruction that corresponds to non-consecutive instructions from the branch instruction will be used for speculative execution. In such a case, Fetch 108 will fetch at an instruction address that represents an instruction address jump from that of the branch instruction. In the embodiments where "delayed branching" techniques are implemented, the processor will start to process the nth instruction after the branch at an address (i.e., a first path of an associated branch instruction) that is different from an address (i.e., a second path of the same associated branch instruction) that is immediately follows the (n−1)th address, where n is a positive integer.

Similar to a two-bit counter, the value of a three-bit counter may be updated after an associated branch instruction is resolved. Generally speaking, each time a resolution of the branch instruction indicates that a branched path is actually taken, the counter's value is increased (until a maximum is reached). Similarly, each time a resolution of the branch instruction indicates that the branched path is not actually taken, the counter's value is decreased (until a minimum is reached).

For example, if the three-bit counter's value currently indicates 0x0 ("strongly not taken"), but if the branch instruction, when resolved, actually takes the branched path, then the counter's value is updated to push it towards the "taken" direction. In this case, since the counter's value is 0x0, the counter's value may be updated to 0x1 (still "strongly not taken"). Since software logic often contains repetitions, the branch instruction may be encountered again. Since the counter's value currently indicates "strongly not taken", but if the branch instruction, when resolved, again actually takes the branched path, then the counter's value is updated to push it further towards the "taken" direction. Accordingly, the counter's value may be updated to 0x2 ("weakly not taken"). Therefore, if a branch instruction is resolved as actually taken enough times, the three-bit counter's value will eventually change to predict a taken value, i.e., either "weakly taken" or "strongly taken".

As in the case of a two-bit saturation counter, in some embodiments, a three-bit branch predictor entry may be updated in a way that is dependent on a cost of a branch that is associated with a branch instruction. For example, if the branch predictor entry currently is "strongly not taken", when a low cost branch resolves to taken, the branch predictor entry may be incremented by one (1), but when a high cost branch that shares the branch predictor entry with the low cost branch resolves to taken, the branch predictor entry may be incremented by two (2). Thus, the high cost branch is given more weight than the low cost branch. Therefore, under this approach, even if the branch predictor entry is shared between two branches, as long as one of the two branches is a low cost one while the other is a high cost one, the interference from the low cost branch to the high cost branch is reduced.

Cost Categories

In embodiments where branch predictor entries are counters that are longer than two bits, instead of classifying branches into two categories, i.e., high or low cost, branches may be classified into three or more categories. For instance, branches may be classified as high cost branches, medium cost branches, or low cost branches. Depending on the number of bits in a counter (such as 104-3 of FIG. 2), even more refined categories than binary or tertiary categories may be defined. Correspondingly, in one embodiment, the speculative processor, or the branch prediction mechanism, may use the number of cycles of instructions speculatively executed as a measure to determine whether a branch belongs to a specific category. In another embodiment, the speculative processor, or the branch prediction mechanism, may determine a specific category for a branch based on whether a load miss caused by an associated branch instruction requires data items to be loaded from level 1 cache, level 2 cache, level 3 cache, main memory, etc. In such an embodiment, a load miss related to level 1 cache may cause a branch to be classified as a low cost branch while a load miss related to main memory may cause a branch to be classified as high cost.

Dynamically Assigned Counter Table

The use of large increments and decrements in a two-bit counter for high cost branches may sometimes produce additional prediction misses that a saturation counter is designed to avoid (for example, where program flows involve loops). On the other hand, the use of three bits or more counters in a speculative processor may increase area cost on a die. Since there are relatively few entries that have the interference problem between high and low cost branches, increasing the number of bits for all branch predictor entries 104 in the array 200 is not efficient if it is infrequent to have a counter that is shared between two or more branches.

Figure 3:
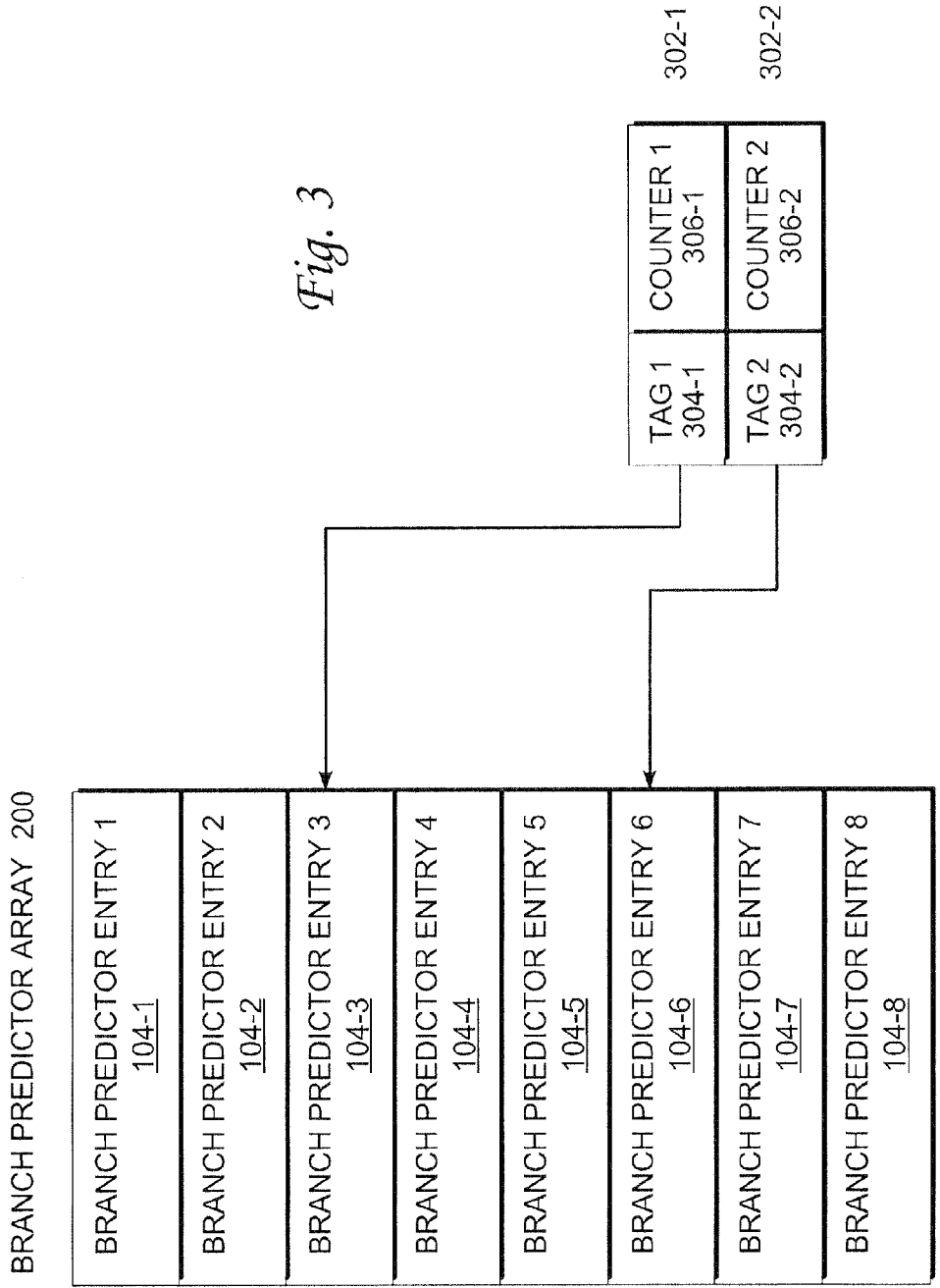
FIG. 3 shows an example of a branch predictor array and a dynamically allocated counter table, in accordance with one embodiment of the present invention.

In some other embodiments, a separate counter with more than two bits may be dynamically assigned to a branch predictor entry 104 in the array 200, say 104-3, when and if that entry is assigned to a high cost branch. This more-than-two-bits separate counter may be called "dynamically assigned counter." Such dynamically assigned counters may be kept in a dynamically assigned counter table (DACT) of a certain size, in one embodiment. As shown in FIG. 3, such a DACT (300) may comprise multiple entries (302-1 and 2), each of which may comprise a tag 304 and a dynamically assigned counter 306 that has a size of more than two bits.

Associativity and Tags in DACT

The DACT may be built as a cache structure. In one embodiment, the DACT is fully associative and any entry 302 in the table 300 may be associated with (or assigned to) any entry 104 of the array 200. In one embodiment, an entry 104's location (for example, 3 for entry 104-3) in array 200 is stored as a tag in 304 of an associated entry 302 of the DACT 300.

In an alternative embodiment, the DACT 300 may have a limited associativity. In that embodiment, entries of the DACT may be grouped in a number of subsets of limited associativity. A subset of bits in a binary representation of an entry 104's location in array 200 may be used to map the entry 104 to a particular subset of associativity in DACT 300; the rest of the bits in the binary representation of the entry 104's position in array 200 may be stored in a tag 304 of an associated entry 302 in that particular subset of associativity in the DACT 300.

In one embodiment, a DACT entry 302 is associated with a branch predictor entry when a prediction miss occurs for a high cost branch. When such a prediction event occurs the first time, the high cost branch may not have been assigned to an entry in 104. Accordingly, an entry 104 will be assigned to the high cost branch.

More specifically, in one embodiment, when a prediction miss occurs, the branch prediction mechanism 106 determines whether this branch is a high cost one. If so, the branch prediction mechanism 106 also associates the entry 104 with an entry 302 in the DACT 300. Since the entry 302 contains a dynamically assigned counter (DAC) 306, this DAC is effectively associated with the entry 104. In associating an entry 104 with an entry 306, the branch prediction mechanism 106 may use a method such as LRU, pLRU, sequential, round-robin, random assignment, etc.

For the purpose of illustration, the association of a DACT entry 302 with a branch predictor entry 104 has been described as happening when a prediction miss occurs for a high cost branch. It should be understood that this is for illustration purpose only. For the purpose of this invention, other approaches as to when to associate a DACT entry 302 with a branch predictor entry 104 may also be used. For example, such an association may occur whenever a prediction event (e.g., a hit or a miss) occurs for a high cost branch the first time. Thus, these and other variations as to when such an association occurs are within the scope of the present invention.

Locating a Dynamically Assigned Counter

Given that an entry 104's location in array 200 is (wholly or in part) stored as a tag in an associated entry 302 in array 300, the branch prediction mechanism 106 can quickly determine whether a branch predictor entry 104 is associated with a particular dynamically assigned counter 306 in an entry 302 of the DACT 300. For example, a branch predictor entry may be entry 104-3. In one embodiment, the DACT 300 is implemented as a fully associative cache structure. Thus, as noted before, any entry 302 in the DACT 300 may be used by any entry 104 including 104-3. To locate if an entry 302 is currently associated with the entry 104-3, tag comparison logic may be used to compare the entry 104-3's position in array 200, i.e., 3 in this case, with tags 304 stored in the DACT 300. In some embodiments, the tag comparison logic can be executed in parallel with respect to one or more tags 304 in the DACT 300. A match from such (parallel) tag comparison indicates that the entry 104-3 is currently associated with a high cost branch (by the fact that the entry 104-3 has been allocated a dynamically assigned counter 306). A particular entry 302 that contains the associated dynamically assigned counter is henceforth identified.

As a further example, in an alternative embodiment, the branch predictor entry may still be 104-3. Now, in that embodiment, the DACT 300 is implemented as a limited associative cache structure. Thus an entry 302 in the DACT 300 is part of a particular subset of associativity in the DACT 300. Such an entry 302 may be used by a subset of entries 104 in branch predictor array 200. Specifically, a subset of bits in a binary representation of entry 104-3's location in array 200 (i.e., 3) may be used to locate the particular subset of associativity in the DACT 300. The rest of the bits in the binary representation of entry 104-3's location in array 200 make up a tag that is stored in an entry 302 in that particular subset of associativity in the DACT 300. Similar to the fully associative case, tag comparison logic may be executed in parallel to locate if an entry 302 in the particular subset of associativity is assigned to the entry 104-3.

Updating a Dynamically Assigned Counter

For the purpose of illustration, as shown in FIG. 3, the third and the sixth entries, i.e., 104-3 and 104-6, in the branch predictor array 200 may contain predictions for high cost branches because the two entries, i.e., 302-1 and 302-2, are respectively assigned to the associated entries 104.

Each time a branch predictor entry 104 is supposed to be updated, the DACT 300 is accessed to see if an entry 302 therein is associated with the branch predictor entry. This access may be performed in accordance with the methods previously described. In some embodiments, this access is done not at the time of making a prediction, but when a branch instruction is actually resolved or executed. As a result, in some embodiments, this access to DACT 300 is not on the critical path in the Fetch stage 108 and will not adversely impact the performance of the processor 102.

In embodiments where dynamically assigned counters are used, instead of incrementing or decrementing a branch predictor entry 104 directly, the branch prediction mechanism 106 may increment or decrement an associated dynamically assigned counter 306 in the matching entry 302. Since this counter 306 consists of more bits than two, a large step of increment or decrement for updating the dynamically assigned counter 306 may be used for a high cost branch. On the other hand, if an increment or decrement is associated with a low cost branch, then a smaller step of increment or decrement for updating the dynamically assigned counter 306 may be used. As a result, the value in the dynamically assigned counter 306 is more biased to give better prediction for the high cost branch than for the low cost branch.

In some embodiments, possible values of a dynamically assigned counter are divided into two spans by a threshold. For example, for a three-bit dynamically assigned counter, the threshold may be set between 3 and 4 (i.e., 3<the threshold<4 for integer arithmetic or 3.5 for floating point arithmetic). Thus, the range of values from zero to seven is divided into two halves. The upper span consists of 4, 5, 6 and 7, while the lower span consists of 0, 1, 2 and 3. Each time, when the threshold is crossed because of an update, an update to the associated branch predictor entry 104 is triggered. For example, if a resolution of a branch prediction causes the value of a dynamically assigned counter 306 to go from the upper span to the lower span, then the branch prediction mechanism may correspondingly set an associated branch predictor entry 104 to a value that indicates that the branch should not be taken. On the other hand, if a resolution of a branch prediction causes the value of a dynamically assigned counter 306 to go from the lower span to the lower span, then the branch prediction mechanism correspondingly updates an associated branch predictor entry 104 to a value that indicates that the branch should be taken.

Example Alternative

In alternatively embodiments, even where dynamically assigned counters are used, a resolution of a branch prediction for a high cost branch may cause the branch prediction mechanism 106 to update a branch predictor entry 104 directly, while a resolution of a branch prediction for a low cost branch, however, may not cause the branch prediction mechanism 106 to update the branch predictor entry. Instead, the branch prediction mechanism 106 first updates a dynamically assigned counter 306 that is associated with the branch predictor entry. Only when the value of the dynamically assigned counter 306 indicates that a certain number of prediction resolutions for the low cost branch have been accumulated in a particular branch path (e.g., the "taken" path), then the branch prediction mechanism 106 updates the branch predictor entry (i.e., increment as in the case of the "taken" path).

It should be understood that the above illustrated ways and all other variations of using dynamically assigned counters to cause high cost branches to have more impact in a more frequent, immediate manner on branch predictor entrys than low cost branches are within the scope of the present invention.

Example Instruction Flows

FIG. 4 shows an example code of instruction flows, in accordance with an embodiment of the present invention. This code may be executed within a loop (not shown) so that it may be executed over and over again. This code contains three branches. The first branch is dependent on a register value (reg0) that is already loaded into the processor. Since it may take ten cycles to load such a register value, a prediction miss of this branch incurs only a cost of ten cycles. The second branch is similar, but depends instead on a different register value (reg8). The third branch, however, is dependent on a value that must be loaded from an external memory location (address 0x6004). Since the speculative processor in various embodiments of the present invention can speculate past a branch, the processor can execute independent instructions following the branch while waiting for a load miss to be resolved. A load miss such as the one related to the third branch that results in access to memory locations external to the processor may take 200 cycles to be resolved. In this example, following the third branch, there are a large number of independent instructions that can be executed. Thus, in one embodiment, at the time when the load miss occurs for the third branch, the branch prediction mechanism 106 may determine that the branch is a high cost branch based on the fact that an external memory location must be accessed to resolve this load miss. Alternatively or additionally, the branch prediction mechanism 106 may determine that the branch is high cost at the time when the branch instruction related to the third branch is resolved or actually executed after the load miss is resolved. In similar manners, the first branch and the second branch may be determined as low cost by the branch prediction mechanism 106.

In some embodiments, branch predictor entries (entries 104) may be two-bit counters. In the present example, the first branch (instruction address 0x0204) and the third branch (instruction address 0x0524) at runtime may share a first branch predictor entry, say entry 104-3. The second branch (0x020c) may use a second branch predictor entry, say entry 104-4, all by itself. The initial state of the first branch predictor entry (104-3) may be 0x2, which corresponds to "weakly taken." This initial state of the second branch predictor entry (104-4) may be 0x3, which corresponds to "strongly taken."

Since the first branch predictor entry (104-3) indicates "weakly taken", when the first branch encounters a load miss that requires a value of reg0 to be loaded from cache, the branch prediction mechanism 106 predicts that a branch should be taken. However, once this prediction is resolved after the value of reg0 is loaded from cache, the branch prediction mechanism 106 determines that the prior prediction was incorrect. In this example, as this branch (i.e., the first branch) is a low cost branch, the branch prediction mechanism 106 initially does not attempt to associate the first branch predictor entry (104-3) with any dynamically assigned counter 306 in the DACT 300. Since the prediction for the first branch generates a prediction miss, a ten-cycle speculative execution work is wasted. As a result of the prediction miss, the first branch predictor entry (104-3) is correspondingly updated to be "weakly not taken" (i.e., the new value of entry 104-3 is now 0x1).

As the code in FIG. 4 is further executed, when the second branch encounters a load miss that requires a value of reg8 to be loaded from cache, the branch prediction mechanism 106 predicts that a branch should also be taken, since the second branch predictor entry (104-4) indicates "strongly taken". After this prediction for the second branch is resolved (for example, after the value of reg8 is loaded from cache), the branch prediction mechanism 106 determines that the prior prediction was in fact correct. As this second branch is also a low cost branch, the branch prediction mechanism 106 does not attempt to associate the second branch predictor entry (104-4) with any dynamically assigned counter 306 in the DACT 300. Since the second branch generates a prediction hit, a ten-cycle speculative execution work is gained while the processor is waiting for the reg8 data. However, since the second branch predictor entry is already of a maximum value possible, the second branch predictor entry (104-4) cannot be updated beyond the existing value of "strongly taken." If the second branch predictor entry were of a different value, the value of the second branch predictor entry would be incremented, for example, by one.

When the third branch is executed, it will encounter a load miss that requires a value of reg1 to be loaded from memory. Since the first branch predictor entry (104-3) now indicates "weakly not taken", which was last set by the first branch, the branch prediction mechanism 106 predicts that a branch should not be taken for the third branch. However, once this prediction for the third branch is resolved (for example, after the value of reg1 is loaded from memory), the branch prediction mechanism 106 determines that the prior prediction was incorrect. Since the third branch generates a prediction miss, a 200-cycle speculative execution work is wasted. As this third branch is a high cost branch, the branch prediction mechanism 106 associates the first branch predictor entry (104-3) with an available dynamically assigned counter 306 in the DACT 300, say a dynamically assigned counter 306-1 in the entry 302 in the DACT 300. The DAC 306-1 may be initially given a value of either 0x2 or 0x3, which indicates a prediction of "weakly not taken." In one embodiment, a value closer to the mid-point threshold, i.e., 0x3 (as 0x2 is further away from the mid-point threshold located between 0x3 and 0x4), is initially set. Since the prediction miss is for the "not taken" path and since the third branch is high cost, the branch prediction mechanism increments the DAC 306-1 towards a "taken" prediction by a large step, say 2. Thus, the DAC 306-1 now has a value of 0x5. As the value of DAC 306-1 has crossed the midpoint threshold which is located between 0x3 and 0x4, the branch prediction mechanism 106 correspondingly updates the first branch predictor entry (104-3). In one embodiment, the first branch predictor entry is updated to have a value of 0x2, which indicates "weakly taken."

Since the branches are in a loop that is repeatedly executed, at the second time when the first branch is predicted and later resolved, a prediction miss occurs because the current value of the first branch predictor entry (104-3) now indicates "weakly taken." However, there is a dynamically assigned counter 306-1 associated with entry 104-3 this time. Therefore, the branch prediction logic 106 updates the dynamically assigned counter 306-1 first before directly updating the value of the first branch predictor entry (104-3). As this prediction miss is for a low cost branch (i.e., the first branch), the branch prediction mechanism 106 only decrements the dynamically assigned counter 306-1 by a small step, which is, in one embodiment, one. The new value of the DAC 306-1 thus becomes 0x4. Since 0x4 is still above the midpoint threshold and more than half of its entire span, there is no crossing of the midpoint threshold. Hence, the value of the first branch predictor entry (104-3) is not altered from its present "weakly taken" prediction. As a result, the next time the third branch is predicted and later resolved, a prediction hit occurs because both the prediction and the resolution indicate "taken".

While this approach may incur additional prediction misses for a low cost branch, this approach is also likely to produce more prediction hits than otherwise for a high cost branch that shares the same branch predictor entry with the low cost branch. Thus, overall speaking, this approach raises the efficiency of a speculative processor.

For the purpose of illustration, initial values of DAC counters have been described as having a value that is close to the midpoint threshold. It should be understood that this is for illustration purpose only. For the purpose of the present invention, other initial value assignment methods may also be used. For example, a value that is further from the midpoint threshold may be used. Thus, all variations of assigning initial values to DAC counters are within the scope of the present invention.

For the purpose of illustration, a step value for a high cost branch has been described as two while a step value for a low cost branch has been described as one. It should be understood that this is for illustration purpose only. For the purpose of the present invention, other step values for updating for a high cost branch or a low cost branch may be used. For example, for a high cost branch, a step value of 3 may be used to increment or decrement a DAC counter. Similarly, for a low cost branch, another value (other than one) may be used to increment or decrement a DAC counter. Thus, these and other variations of step values used to update a DAC counter for a branch of certain cost are within the scope of the present invention.

For the purpose of illustration, a high cost branch has been described as involving hundreds of computing cycles or more while a low cost branch has been described as involving tens of computing cycles. It should be understood that this is for illustration purpose only. Other orders of magnitudes may be used to determine whether a branch is high cost or low cost. Furthermore, as noted, in some embodiments, a branch may be classified into more categories than just a low cost category and a high cost category. Thus, all variations of criteria to classify a branch's cost are within the scope of the present invention.

Example Operation

Figure 5:
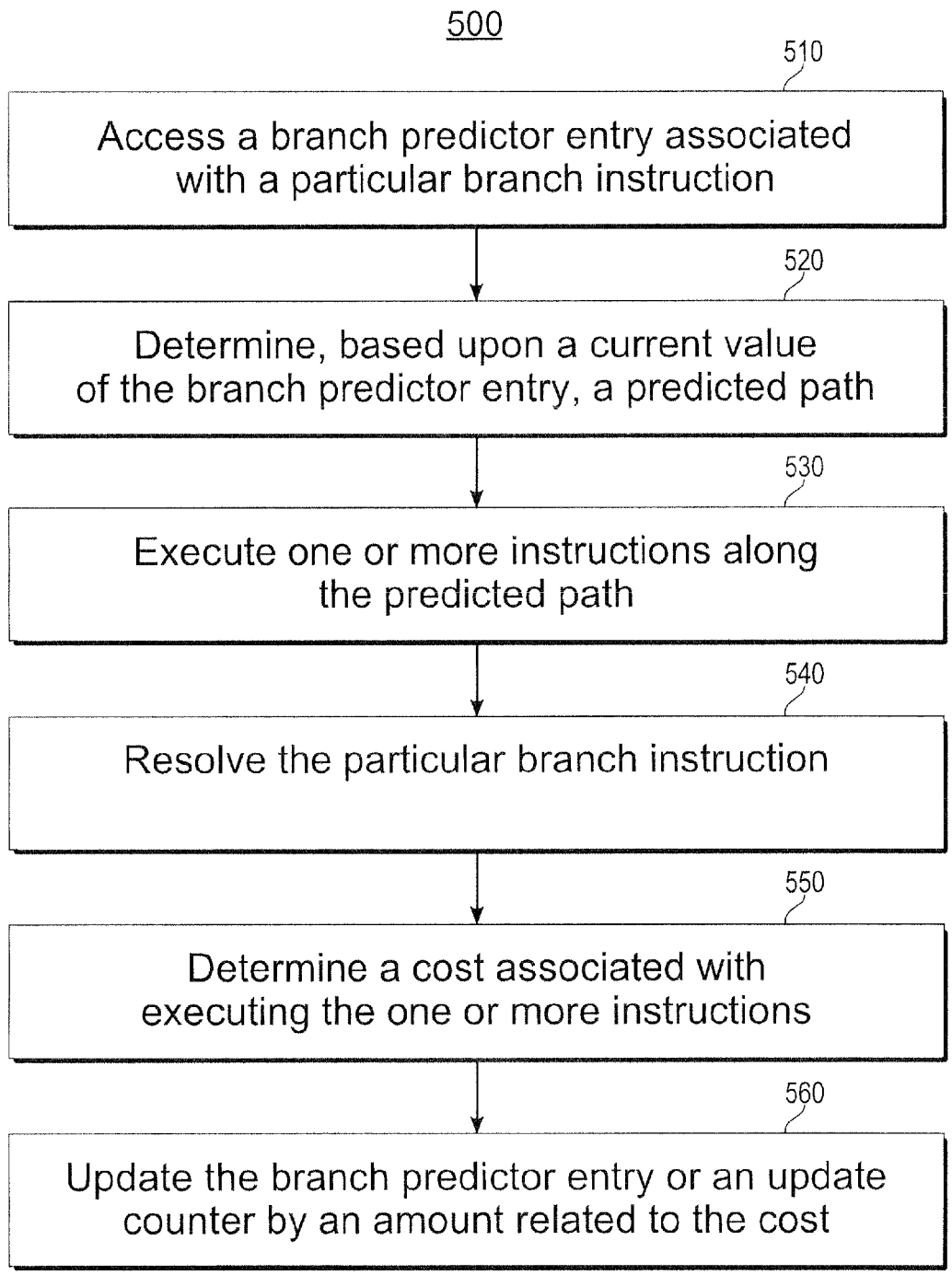
FIG. 5 shows an high level flow of a methodology, in accordance with one embodiment of the present invention.

A flow diagram which provides a high level overview of the methodology is shown in FIG. 5.

Initially, the speculative process executes some instruction flows (e.g., FIG. 4) that contain branch instructions. At some point, the speculative processor encounters a particular branch instruction. This particular branch instruction requires data to be loaded from other memory locations to the speculative processor (i.e., a load miss). The load miss may take a number of computing cycles. The speculative processor, or the branch prediction mechanism, accesses a branch predictor entry associated with the particular branch instruction (block 510 of FIG. 5).

As described above, in some embodiments, the branch predictor entry is in an array of branch predictor entries (e.g., 200 of FIG. 2); and the branch prediction mechanism may use one or more bits in the binary representation of the branch instruction's address as an index to locate the branch predictor entry in such an array (i.e., 200). Here, the branch predictor entry can take on a plurality of different values. For example, a first set of values indicates a first possible path, while a second set of values indicates a second possible path.

In some embodiments, the branch predictor entry may be a saturation counter in an array of saturation counters. In some embodiments, the branch predictor entry is an n-bits-wide counter, where n is an integer that is no less than one.

In some embodiments, the first possible path starts at a first instruction address that immediately follows an address of the particular branch instruction. In contrast, the second possible path starts at a second instruction address that is different from the first instruction address.

The branch prediction mechanism then determines, based upon a current value of the branch predictor entry, a predicted path for the particular branch instruction (block 520 of FIG. 5). Thereafter, the speculative processor executes, before the particular branch instruction is resolved (i.e., speculatively), one or more instructions along the predicted path (block 530 of FIG. 5). When the load miss is resolved, the speculative processor also resolves the particular branch instruction (block 540 of FIG. 5). As used herein, the phrase "resolves the particular branch instruction" means that the particular branch instruction is actually executed and that the prior prediction for the predicted path of the particular branch instruction is resolved to a hit or a miss.

In some embodiments, the step of executing one or more instructions along the predicted path includes generating results of executing the one or more instructions and keeping the results in temporary storage locations without committing. The temporary storage location can be, but is not limited to, processor registers, caches, internal processor memory space, etc. In addition, in these embodiments, the step of resolving the particular branch instruction includes determining whether the predicted branch is correct. In response to determining that the predicted branch is correct, the speculative processor commits the results of executing the one or more instructions. On the other hand, in response to determining that the predicted branch is not correct, the speculative processor flushes the results of executing the one or more instructions from the temporary storage locations.

Next, the branch prediction mechanism determines a cost associated with executing the one or more instructions (block 550 of FIG. 5). In one embodiment, the cost is determined based in part on a type of memory that is accessed in order to actually execute the branch instruction. In one embodiment, the cost is one of n levels, where n is an integer that is no less than two. In another embodiment, cost is number of cycles consumed before branch instruction is resolved.

In any event, after the cost is determined, the branch prediction mechanism updates the current value of the branch predictor entry by an amount that is commensurate with the cost (block 560 of FIG. 5). For example, the amount (i.e., step value as previously described) for a high cost branch may be two. However, the amount for a low cost branch may be one, instead. In some embodiments (for example, where dynamically assigned counters are used, as previously described), before updating the current value of the branch predictor entry, the branch prediction mechanism updates a current value of an update counter (e.g., a dynamically assigned counter in an entry 302 that is associated with the branch predictor entry) by an amount that is commensurate with the cost (block 560 of FIG. 5). In one embodiment, if the value of the update counter crosses a threshold for the update counter, then the current value of the branch predictor entry will be updated. Otherwise, the current value of the branch predictor entry is unchanged.

Figure 6:
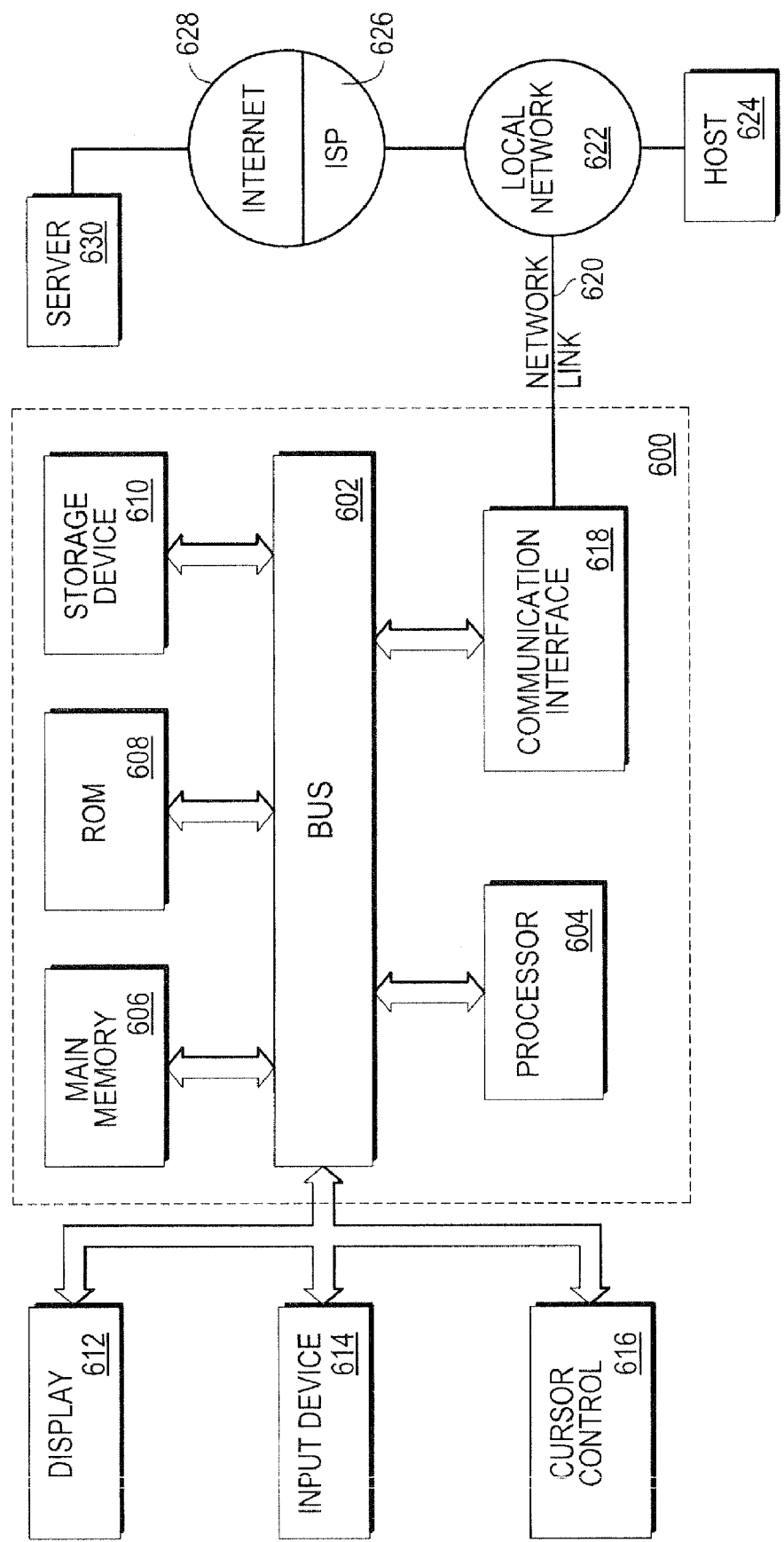
FIG. 6 shows an example of a computer system including a processor, in which one embodiment of the present invention may be implemented.

FIG. 6 shows an example of a computer system including a processor, in which one embodiment of the present invention may be implemented. As those skilled in art will appreciate a computer connected system 600 may includes a bus 602 connecting a processor 604 with a main memory 606, ROM 608, a storage device 610, and a communication interface 618. Also, the computer system 600 is connected to a display 612, and input device 614, and a cursor control 616. Further, via a network link 620, the computer system 600 may be connected to a local network 622, which may connect to a host 624 and, through an ISP 626 and the Internet 628, a server 630.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method for improving efficiency of speculative execution of instructions, implemented by a computer processor comprising:

accessing a branch predictor entry associated with a particular branch instruction, wherein the branch predictor entry can take on a plurality of different values with a first set of values indicating a first possible path and a second set of values indicating a second possible path;

determining, based upon a current value of the branch predictor entry, a predicted path for the particular branch instruction;

executing, by the processor, before the particular branch instruction is resolved, one or more instructions along the predicted path;

resolving the particular branch instruction;

determining a cost associated with executing the one or more instructions; and updating the current value of the branch predictor entry by an amount that is commensurate with the cost associated with executing the one or more instructions before the particular branch instruction is resolved.

2. The method of claim 1, wherein the branch predictor entry is a saturation counter in an array of saturation counters.

3. The method of claim 1, wherein the branch predictor entry is n bits wide and wherein n is an integer that is no less than one.

4. The method of claim 1, wherein the first possible path starts at a first instruction address that immediately follows an address that is (n−1)th address from the particular branch instruction and wherein the second possible path starts at a second instruction address that is different from the first instruction address and wherein n is a positive integer.

5. The method of claim 1,
wherein executing one or more instructions along the predicted path includes:
generating results of executing the one or more instructions; and
keeping the results in temporary storage locations without committing; and wherein resolving the particular branch instruction includes:
  determining whether the predicted branch is correct;
  in response to determining that the predicted branch is correct, committing the results of executing the one or more instructions; and
  in response to determining that the predicted branch is not correct, flushing the results of executing the one or more instructions from the temporary storage locations.

6. The method of claim 1, wherein the cost is determined based in part on a type of memory that is accessed in order to actually execute the branch instruction.

7. The method of claim 1, wherein the cost is determined based in part on a number of cycles that are taken before the particular branch instruction is actually resolved.

8. The method of claim 1, wherein the cost is one of n levels and wherein n is an integer that is no less than two.

9. A method for improving efficiency of speculative execution of instructions, implemented by a computer processor comprising:
  accessing a branch predictor entry associated with a particular branch instruction, wherein the branch predictor entry can take on a plurality of different values with a first set of one or more values indicating a first possible path and a second set of one or more values indicating a second possible path;
  determining, based upon a current value of the branch predictor entry, a predicted path for the particular branch instruction;
  executing, by the processor before the particular branch instruction is resolved, one or more instructions along the predicted path;
  resolving the particular branch instruction;
  determining a cost associated with executing the one or more instructions before the particular branch instruction is resolved;
  accessing an update indicator associated with the branch predictor entry, wherein the update indicator indicates whether the branch predictor entry should be updated;
  updating a current value of the update indicator by an amount that is commensurate with the cost associated with executing the one or more instructions before the particular branch instruction is resolved to derive an updated value for the update indicator;
  determining, based upon the update value for the update indicator, whether the current value for the branch predictor entry should be updated; and in response to a determination that the current value for the branch predictor entry should be updated, updating the current value for the branch predictor entry to derive an updated value for the branch predictor entry.

10. The method of claim 9, wherein the branch predictor entry is a saturation counter in an array of saturation counters.

11. The method of claim 9, wherein the branch predictor entry is n bits wide and wherein n is an integer that is no less than one.

12. The method of claim 9, wherein the first possible path starts at a first instruction address that immediately follows an address that is (n−1)th address from the particular branch instruction and wherein the second possible path starts at a second instruction address that is different from the first instruction address and wherein n is a positive integer.

13. The method of claim 9,
  wherein executing one or more instructions along the predicted path includes:
    generating results of executing the one or more instructions; and
    keeping the results in temporary storage locations without committing; and
  wherein resolving the particular branch instruction includes:
    determining whether the predicted branch is correct;
    in response to determining that the predicted branch is correct, committing the results of executing the one or more instructions; and
    in response to determining that the predicted branch is not correct, flushing the results of executing the one or more instructions from the temporary storage locations.

14. The method of claim 9, wherein the cost is determined based in part on a type of memory that is accessed in order to actually execute the branch instruction.

15. The method of claim 9, wherein the cost is determined based in part on a number of cycles that are taken before the particular branch instruction is actually resolved.

16. The method of claim 9, wherein the cost is one of n levels and wherein n is an integer that is no less than two.

17. An apparatus for improving efficiency of speculative execution of instructions, comprising:
  means for accessing a branch predictor entry associated with a particular branch instruction, wherein the branch predictor entry can take on a plurality of different values with a first set of values indicating a first possible path and a second set of values indicating a second possible path;
  means for determining, based upon a current value of the branch predictor entry, a predicted path for the particular branch instruction;
  means for executing, before the particular branch instruction is resolved, one or more instructions along the predicted path;
  means for resolving the particular branch instruction;
  means for determining a cost associated with executing the one or more instructions; and
  means for updating the current value of the branch predictor entry by an amount that is commensurate with the cost associated with executing the one or more instructions before the particular branch instruction is resolved.

18. The apparatus of claim 17, wherein the branch predictor entry is a saturation counter in an array of saturation counters.

19. The apparatus of claim 17, wherein the branch predictor entry is n bits wide and wherein n is an integer that is no less than one.

20. An apparatus for improving efficiency of speculative execution of instructions, comprising:
  means for accessing a branch predictor entry associated with a particular branch instruction, wherein the branch predictor entry can take on a plurality of different values with a first set of one or more values indicating a first possible path and a second set of one or more values indicating a second possible path;
  means for determining, based upon a current value of the branch predictor entry, a predicted path for the particular branch instruction;
  means for executing, before the particular branch instruction is resolved, one or more instructions along the predicted path;
  means for resolving the particular branch instruction;
  means for determining a cost associated with executing the one or more instructions before the particular branch instruction is resolved;

means for accessing an update indicator associated with the branch predictor entry, wherein the update indicator indicates whether the branch predictor entry should be updated;

means for updating a current value of the update indicator by an amount that is commensurate with the cost associated with executing the one or more instructions before the particular branch instruction is resolved to derive an updated value for the update indicator;

means for determining, based upon the update value for the update indicator, whether the current value for the branch predictor entry should be updated; and in response to a determination that the current value for the branch predictor entry should be updated, updating the current value for the branch predictor entry to derive an updated value for the branch predictor entry.

* * * * *